United States Patent [19]

Treves et al.

[11] 4,423,760

[45] Jan. 3, 1984

[54] TIRE TREAD WITH ZIG-ZAG GROOVES HAVING GROOVE SIDEWALLS OF VARYING DEGREES OF SUPPORT

[75] Inventors: Barry W. Treves, Walsall; Ian Kemp, Tamworth, both of England

[73] Assignee: Dunlop Limited, London, England

[21] Appl. No.: 384,496

[22] Filed: Jun. 3, 1982

[30] Foreign Application Priority Data

Jun. 12, 1981 [GB] United Kingdom ............... 8118219

[51] Int. Cl.$^3$ .............................................. B60C 11/06
[52] U.S. Cl. .............................. 152/209 R; D12/143; D12/145; 428/169
[58] Field of Search ........... 152/209 R, 209 A, 209 B, 152/209 NT, 209 WT, 209 D; D12/142–145; 428/159–160, 167, 169

[56] References Cited

U.S. PATENT DOCUMENTS

| | | | |
|---|---|---|---|
| 2,706,509 | 4/1955 | White | 152/209 R |
| 3,055,410 | 9/1962 | Caulkins | 152/209 R |
| 3,664,402 | 5/1972 | Montagne | 152/209 R |
| 3,951,193 | 4/1976 | Yeager | 152/209 R |

FOREIGN PATENT DOCUMENTS

| | | |
|---|---|---|
| 1480927 | 3/1969 | Fed. Rep. of Germany . |
| 2317112 | 2/1977 | France ........................ 152/209 |
| 986365 | 9/1964 | United Kingdom . |
| 1424013 | 2/1976 | United Kingdom . |
| 1573223 | 8/1980 | United Kingdom . |

Primary Examiner—Lois E. Boland
Attorney, Agent, or Firm—Stevens, Davis, Miller & Mosher

[57] ABSTRACT

A tire tread for a truck tire, especially of radial ply construction and designed for use on well-made roads, comprising a small number of zig-zag grooves. The sidewalls of each groove are each provided with a supporting buttress of varying height or width such that the maximum support is provided at or adjacent the points where the groove projects into the surrounding tread rubber. The provision of such a buttress provides a varying degree of support for each groove sidewall along the length of the groove and assists in preventing uneven wear of the tread rubber and reduces damage caused by stones trapped in the groove.

19 Claims, 27 Drawing Figures

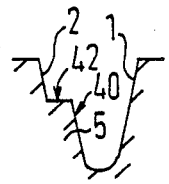
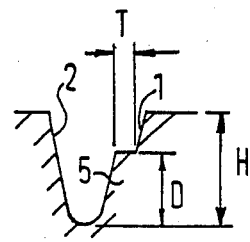
FIG.13  FIG.14
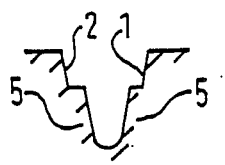
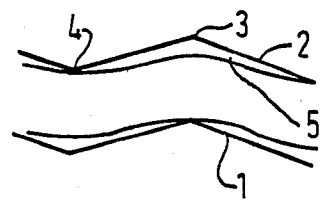
FIG.15  FIG.16
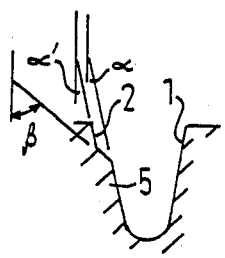
FIG.17

TIRE TREAD WITH ZIG-ZAG GROOVES HAVING GROOVE SIDEWALLS OF VARYING DEGREES OF SUPPORT

This invention concerns tire treads, especially, but not exclusively, tire treads for pneumatic tires used for heavy duty automotive transport e.g. vehicles such as lorries, buses, coaches and the like. Such tires are often known generally as "truck tires".

It is well known to provide a truck tire tread with a pattern consisting of a small number, e.g. 3 or 4, of circumferentially-extending zig-zag grooves of constant U- or V-shaped cross-section disposed across the tread width in such a way as to subdivide the tread into circumferential ribs. The purpose of such a tread pattern is to rupture the liquid film which forms, for example when it rains, between the contact area of the tire tread and the road surface thereby allowing removal of the liquid through the grooves and also to provide a series of edges which assist traction and braking.

However, such a tread pattern, when used on a radial ply carcass truck tire, intended for use on well-made roads, e.g. motorways, is often found to be subject to a peculiar type of uneven wear giving rise to the formation of furrows which progressively increase in width and depth. These furrows initially grow from areas of increased wear in the region in which a rib projects into the adjacent groove i.e. the re-entrant portion of the groove, the areas gradually increasing in size circumferentially and transversely. Several explanations for this have been put forward and it is considered that this problem is mainly due to the relatively high loading on a truck tire, the distortion of the tread as it passes through the contact patch, particularly in the region in which a rib projects into the adjacent groove, and the presence of a substantially rigid and circumferentially inextensible reinforcement (the "breaker") between the crown of the radial ply carcass and the tread.

It is an object of the present invention to provide a tire tread for incorporation into a radial ply carcass truck tire which mitigates the above-mentioned problem of uneven wear without significantly altering the wet grip capability of the tire.

Another problem commonly encountered by all types of tire treads is that of stone trapping. If a stone or a piece of gravel or a like object is of similar or slightly larger size to a groove in the tire tread there is the danger of it becoming lodged in the groove. As the tire rotates the stone or the like object rubs against the groove boundary and can cause damage. The likelihood of damage occurring is greatest when the stone or like object contacts the groove base or the junction between adjacent zig-zag lengths of a groove since a tear can start from these locations. If a stone does become lodged in a groove and can be prevented from contacting the groove base or a junction between zig-zag lengths the possibility of a tear being caused is substantially reduced. It is felt that some embodiments of the present invention may assist in preventing the damage referred to above.

Thus while the primary object of the present invention is to overcome the uneven wear described above, a secondary object is to provide a tire tread for incorporation into a tire having either a radial ply or cross ply carcass which reduces damage caused by trapped stones, gravel or like objects.

According to one aspect of the present invention a tire tread comprises an elongate strip having a pattern formed in that surface which is intended to contact the ground in use of a tire incorporating the tire tread wherein the pattern includes a continuous or discontinuous zig-zag groove extending generally longitudinally of the strip, the groove comprising two sidewalls, one on each side of the groove, each sidewall comprising straight or substantially straight portions each of which extends at an acute angle to the length of the strip, and a buttress supporting a part at least of one of the portions, the size or shape of the buttress varying along the portion to provide a progressively increasing degree of support thereto, the minimum degree of support being provided at or adjacent to that end of the portion extending into the groove, and the maximum degree of support being provided at or immediately adjacent that end of the portion extending into the tread.

Preferably the degree of support is varied by varying the height of the buttress. Alternatively, or additionally, the degree of support may be varied by varying the width of the buttress, the width being measured either perpendicularly to the groove sidewall portion, or perpendicularly to the length of the strip. The buttress may or may not extend along the entire length of one sidewall portion. The buttress may be continuous or discontinuous along said length of a portion.

Any variation in the height or width of the buttress may be gradual or stepwise and a gradual variation may be rectilinear or curvilinear. Preferably the height of the buttress is a minimum where the groove sidewall projects into the groove and the maximum height of the buttress may correspond to all or part of the overall groove depth.

Preferably the side surface of the buttress is inclined to the normal to the tread surface at a constant angle over the entire length thereof. Preferably said angle of inclination is substantially the same as the angle of inclination of the groove sidewall portion. The top surface of the buttress may be parallel to that surface of the tire tread which is intended to contact the surface of the ground in use of a tire incorporating the tread or inclined at an angle thereto when a cross-section, at right angles to the length of the strip or the groove, is considered.

The tire tread according to the first aspect of the present invention may be formed as a separate component suitable for use in building or retreading a tire or it may be formed integrally with a tire.

Thus according to a further aspect of the present invention there is provided a pneumatic tire having a tire tread according to the first aspect of the present invention. As explained above, the tire is preferably a truck tire having a radial ply carcass but some embodiments of the tire tread according to the invention may be advantageously incorporated with a cross-ply carcass.

Several embodiments of tire treads in accordance with the invention will now be described in more detail, by way of example only, with reference to the accompanying drawings wherein:

FIG. 13 is a section on line XIII—XIII of FIG. 12;

FIG. 14 is a section on line XIV—XIV of FIG. 12;

FIG. 15 is a section on line XV—XV of FIG. 12;

FIG. 16 is a plan view of a portion of a modification of the third embodiment;

FIG. 17 is a cross-section through a groove of a tread according to a modification to any of the aforementioned embodiments;

Figure 1:
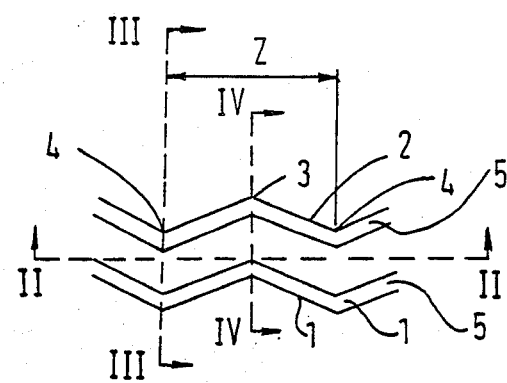
FIG. 1 is a plan view of a part of a first embodiment of a tire tread in accordance with the present invention.
Figure 2:
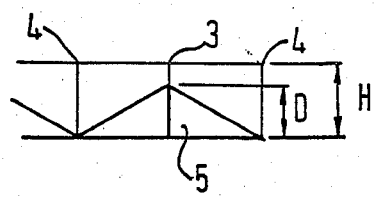
FIG. 2 is a view on the line II—II of FIG. 1.
Figure 3:
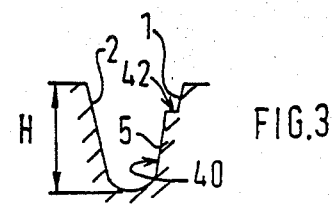
FIG. 3 is a section on the line III—III of FIG. 1.
Figure 4:
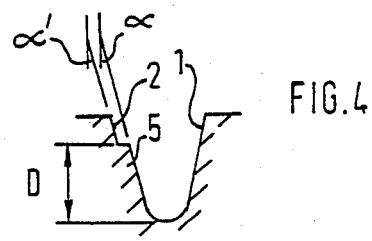
FIG. 4 is a section on the line IV—IV of FIG. 1.

In each of the accompanying drawings (FIGS. 1–17) of the first three embodiments there is shown a part of a tire tread in which is formed a circumferentially-extending groove of zig-zag profile. Each groove has opposed sidewalls, 1, 2 having projecting points 3, which extend into the adjacent tire tread, and re-entrant points 4. In accordance with the present invention each sidewall 1, 2 is supported along the length thereof, the maximum degree of support being in the region of each projecting point 3 of the groove. More particularly in each of the illustrated embodiments the support is provided by a stiffening buttress 5 formed, in effect by increasing the thickness of each groove sidewall in a controlled manner.

In the first embodiment shown in FIGS. 1 to 4 the buttress 5 extends along the entire axial length of each complete zig-zag Z comprising two adjacent sidewall portions and is of variable depth D in the direction of the length of the groove, increasing progressively in a rectilinear manner from a minimum at each re-entrant point 4 where D=0 to a maximum at each projecting point 3 between successive re-entrant points 4 where D is about 70% of the groove depth H.

In the second embodiment shown in FIGS. 5 to 7 the buttress 5 again extends along the entire axial length of each complete zig-zag Z and is of variable depth in the direction of the length of the groove, increasing from a minimum at each re-entrant point 4 where D is about 20% of the groove depth H to a maximum at each projecting point 3 between successive re-entrant points, where D is about 60% of the groove depth H. However, unlike the previous embodiment the increase in depth is stepwise as opposed to rectilinear. Thus in each of the two adjacent sidewall portions forming each complete zig-zag Z there are three distinct buttress heights, the height of the central part being about 40% of the groove depth H. As a modification other numbers of buttress heights may be used.

In each of the above-described embodiments the side surface 40 of the buttress 5 facing the interior of the groove is inclined to the normal to the tread surface at a constant angle $\alpha$ over the entire length thereof and said angle is substantially the same as the angle of inclination $\alpha'$ of the remaining sidewall portion i.e. the groove sidewall if the buttress were not present. It will be appreciated however that the angle of inclination $\alpha$ of the side surface of the buttress may differ from that of the remaining portion although in all cases the angle is constant over the entire length of the buttress. Preferably the angle of inclination is positive, to facilitate removal of the tire from the mould i.e. there is no undercut, and may, for example, be in the range $0° > \alpha < 30°$.

Figure 8:
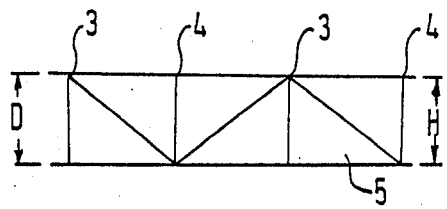
FIG. 8 is a view similar to that on line II—II of FIG. 1 of a part of a tire tread in accordance with a modification of the first embodiment.

Additionally in each of the above-described embodiments the maximum depth D of the buttress 5 is less than the overall maximum height H of the groove. However, it is to be understood the maximum depth D may be selected to correspond to all or part of the groove height H. For example, FIG. 8 shows the first embodiment modified so that the maximum value of D, the buttress depth, equals the groove depth H.

Figure 9:
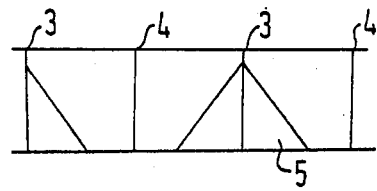
FIG. 9 is a view similar to that on line II—II of FIG. 1 of a part of a tire tread in accordance with a second modification of the first embodiment.

FIG. 9 illustrates a second modification to the first embodiment. The buttress 5, instead of extending over the whole of the length of one sidewall portion, only extends for part of the distance. However the buttress 5, one part in each adjacent portion, is still symmetrically disposed with respect to the projecting point 3 of the groove.

Figure 10:
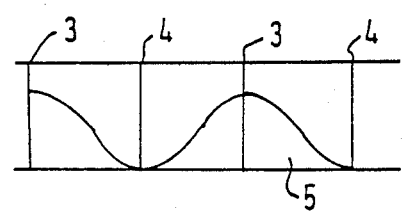
FIG. 10 is a view similar to that on line II—II of FIG. 1 of a part of a tire tread in accordance with a third modification of the first embodiment.

FIG. 10 illustrates a third modification to the first embodiment in which the variation in depth D of the buttress does not occur in a rectilinear manner but in a curvilinear manner. From inside the groove, the buttress 5 appears as a series of smoothly curved humps, one hump per zig-zag of the groove (or one half-hump for each sidewall portion).

Figure 5:
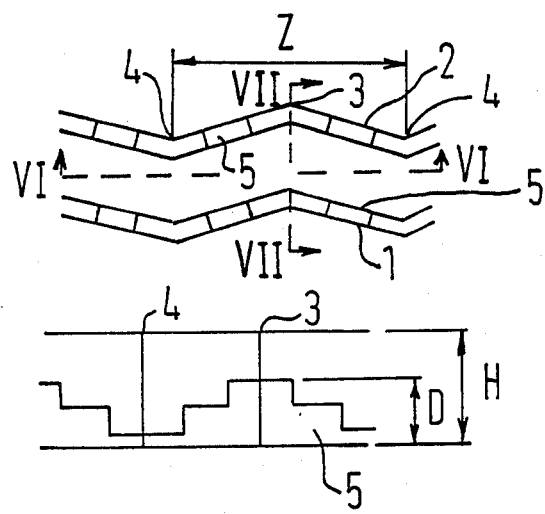
FIG. 5 is a plan view of a part of a second embodiment of a tire tread in accordance with the present invention.
Figure 6:
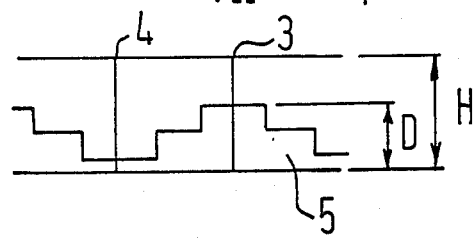
FIG. 6 is a view on the line VI—VI of FIG. 5.
Figure 7:
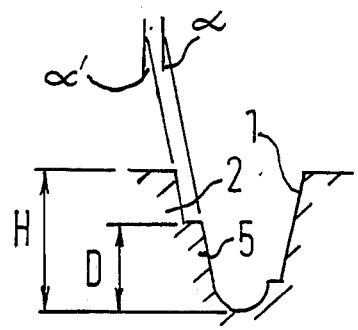
FIG. 7 is a section on the line VII—VII of FIG. 5.
Figure 11:
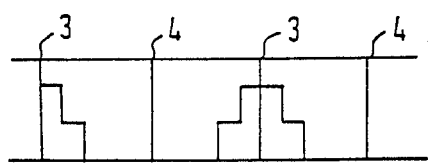
FIG. 11 is a view similar to that on line VI—VI of FIG. 5 of a part of a tire tread in accordance with a modification of the second embodiment.
Figure 12:
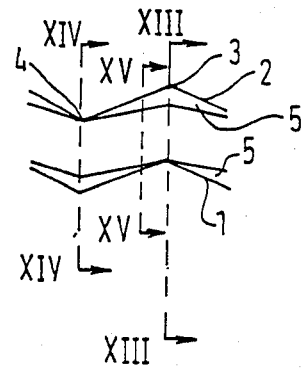
FIG. 12 is a plan view of a part of a third embodiment of a tire tread in accordance with the invention.

FIG. 11 illustrates a modification to the second embodiment of the invention illustrated in FIG. 5, 6, and 7. The depth of the buttress 5 changes in a stepwise manner, but the buttress only extends over part of the length of a sidewall portion. However, the buttress 5 is still symmetrically disposed with respect to the projecting point 3 of the groove.

In the fourth embodiment illustrated in FIGS. 12, 13, 14 and 15, the buttress 5 extends along the entire length of one complete zig-zag. The buttress depth D remains constant but the buttress thickness T varies in a rectilinear manner, the maximum thickness occurring at a projecting point 3 of the groove and the minimum thickness, in this embodiment, zero, occurring at a re-entrant point 4. The buttress depth D is about 70% of the groove depth H whilst the maximum thickness of the buttress 5 is about a quarter of the groove width at the surface intended to contact the ground.

In a modification of the fourth embodiment, illustrated in FIG. 16, the thickness T of the buttress varies in a curvilinear manner from a maximum at a projecting point 3 of the groove to a minimum (zero) at a re-entrant point 4 of the groove.

In all four embodiments described, the top surface 42 of the buttress 5 is parallel to the ground-contacting surface of the tread. However, it may alternatively be inclined at an angle thereto. In FIG. 17, which illustrates this, the top surface of the buttress 5 is inclined at an angle $\beta$ to the normal to the tread surface, $\beta$ being greater than $\alpha$ or $\alpha'$.

In all the embodiments described above the sidewall portions of the zig-zag groove are of equal length, and the pitch and amplitude also remain constant. However the invention is not limited to tire treads having only such grooves. If a tire tread has for example, a zig-zag groove having groove sidewall portions of unequal length, then the buttress 5 may not be symmetrical with respect to the projecting point 3 of the groove.

The buttress 5 is provided, as explained above, to support the groove sidewall. By varying the height and/or thickness of the buttress the degree of support varies. The tread material immediately adjacent the groove is caused to have variable stiffness or resilience, depending on its position relative to the re-entrant or projecting points of the groove. By suitable variation of the position, height and/or thickness of the buttress, and taking into account the tire size and other properties of the tread, e.g. the tread material, the groove shape and/or width, the problem of uneven wear outlined above may be substantially reduced or overcome.

In addition, some embodiments of the invention may overcome the problem of stone trapping. If a stone or piece of gravel is slightly larger than the groove width there is a clear danger that it will become lodged in the groove. However the buttresses, one on each side of the groove as shown from example in FIG. 1-4, will prevent a stone from reaching the base of the groove and the junctions of the groove sidewall portions, both positions where a stone can cause most damage. Instead the stone remains lodged away from the groove base and approximately midway along the length of a sidewall portion. Eventually a trapped stone will be thrown clear as the tread wears in use of the tire.

The fourth embodiment comprises a tread for a radialply truck tire size 295/80 R22.5, the tread having four longitudinally-extending zig-zag grooves, separated by three ribs.

Figure 18:
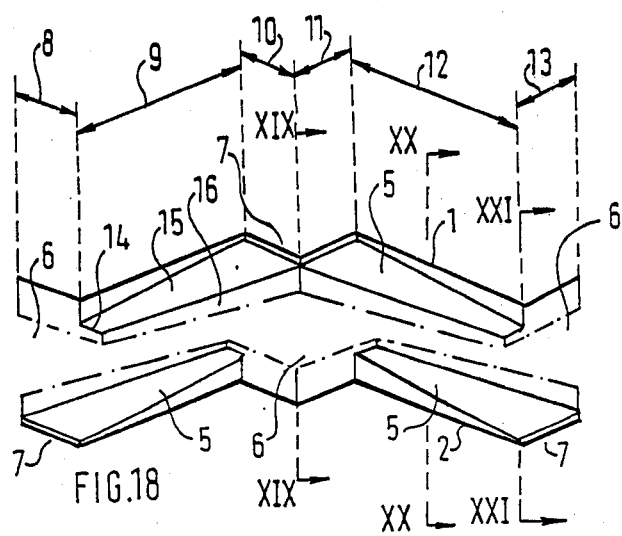
FIG. 18 is a plan view of part of a fourth embodiment of a tire tread in accordance with the present invention.
Figures 19, 20, 21:
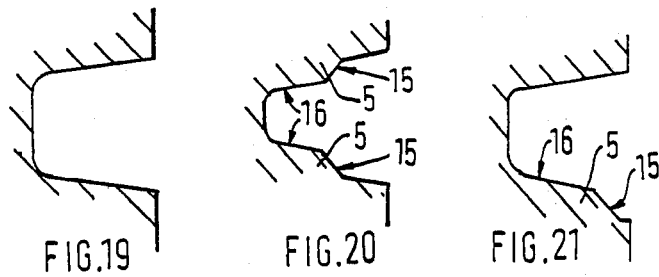
FIG. 19 is a section on the line XIX—XIX of FIG. 18.
FIG. 20 is a section on the line XX—XX of FIG. 18.
FIG. 21 is a section on line XXI—XXI of FIG. 18.
Figure 22:
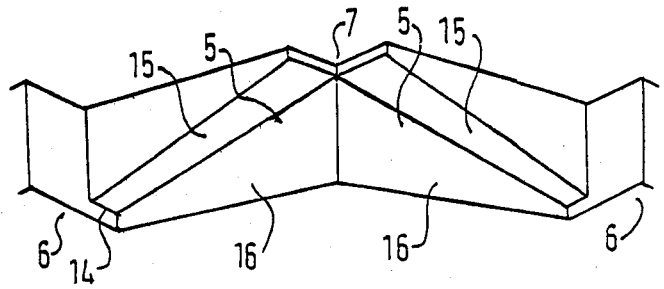
FIG. 22 is a perspective view of part of one of the groove sidewalls illustrated in FIG. 18.

As shown in FIGS. 18, 19, 20, 21 and 22 the groove configuration of this tire tread is more complex than that described previously. The groove is basically of zig-zag configuration, but at each re-entrant part of the groove i.e. where the rubber of the tread projects into the groove, there is a small recess 6 (which is V-shaped in plan) in the tread rubber, while at each projecting part of the groove there is a small projection 7 (which is also V-shaped in plan). As can be seen in FIG. 18, and moving from left to right, the groove comprises first, short length 8, a second, long length 9, a third, short length 10, a fourth, short length 11, a fifth, long length 12 and a sixth, short length 13. Each length extends diagonally to the length of the tread and in the opposite sense to the next adjacent length. This group of six lengths makes up one pitch length of a truck tire tread having a total pitch length of 52 mm, the arrangement in each pitch being repeated along the complete tread length i.e. around the tire circumference. Each short length is 5 mm and each long length is 16 mm, measured along the length of the tread. However, around the tire circumference the pitch lengths may be varied, to lessen the generation of unwanted noise caused by the contact of repeating tread elements on the ground in use of the tire.

Each length comprises two groove sidewall portions, one on each side of the groove. The groove sidewalls are the same on each side except that due to the zig-zag nature of the groove, there is a displacement of one groove sidewall relative to the other by half a pitch length.

As can be seen in the Figures, along each long length is a buttress which varies rectilinearly in height. For example, the highest part of the buttress 5 along the first long length 9 merges with the second short length 10 of the groove sidewall, which defines one side of the small projection 7 formed at the re-entrant part of the main zig-zag groove. The lowest part of the buttress projects into the groove and ends in a small step 14. The upper surface 15 is inclined to the normal to the tread surface. The side surface 16 of the buttress is not parallel to the long length 9 of the groove sidewall which it supports. It is wider at the highest part by the projection 7 and narrowest at the lowest part i.e. the step 14, whether measured perpendicularly to the groove sidewall or to the length of the strip. The variation in width is rectilinear. The V-shaped recess 6 at the re-entrant part of the groove is not supported by any buttress.

Thus in the tread of the fourth embodiment there is maximum support for the groove sidewall, provided not only by the buttress 5 being of maximum height and width, but also due to the presence of the V-shaped projection 7, which in effect can be regarded as part of the buttress 5 itself. There is minimum support at the re-entrant part of the groove, not only because the buttress ends short of the junction between groove sidewall portions, but also because of the V-shaped recess in the groove sidewall.

Figure 23:
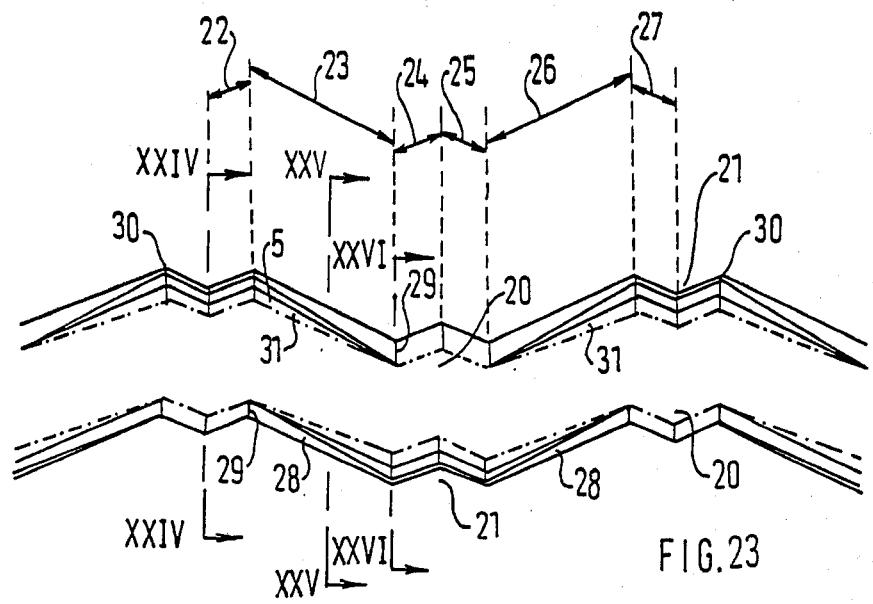
FIG. 23 is a plan view of part of a fifth embodiment of a tire tread in accordance with the present invention.
Figures 24, 25, 26:
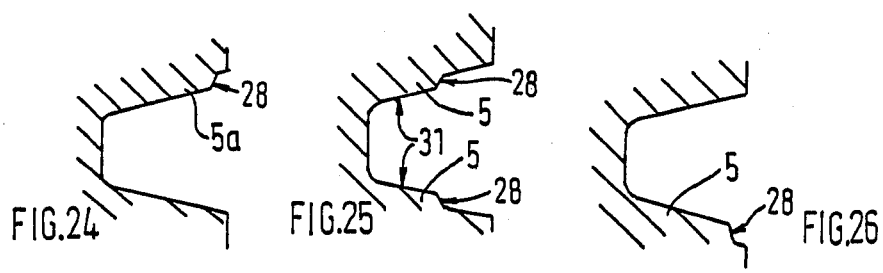
FIG. 24 is a section on line XXIV—XXIV of FIG. 23.
FIG. 25 is a section on line XXV—XXV of FIG. 24.
FIG. 26 is a section on line XXVI—XXVI of FIG. 25.
Figure 27:
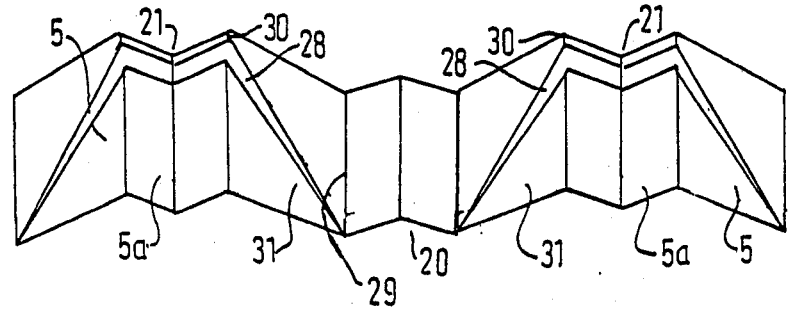
FIG. 27 is a perspective view of part of one of the groove sidewalls illustrated in FIG. 23.

The fifth embodiment illustrated in FIGS. 23-27, comprises a tire tread for use on a radial-ply truck tire size 295/80 R22.5 having four circumferential grooves. Each of the four grooves is basically of zig-zag configuration but at each re-entrant part of the groove, i.e. where the rubber of the tread projects into the groove, there is a small recess 20 (which is V-shape in plan), in the tread rubber while at each projecting part of the groove there is a small projection 21 (which is also V-shaped in plan). As can be seen in FIG. 23, and moving from left to right, the groove comprises a first, short length 22, a second, long length 23, a third, short length 24, a fourth, short length 25, a fifth, long length 26 and a sixth, short length 27. Each length extends diagonally to the length of the tread and in the opposite sense to the next adjacent length. This group of six lengths makes up one pitch length of a truck tire tread having a total pitch length of 52 mm (measured along the tread length) the arrangement in each pitch being repeated along the complete tread length i.e. around the tire circumference. Each short length is 5 mm and each long length is 16 mm measured along the length of the tread. However around the tire circumference, the pitch lengths may be varied to lessen the generation of unwanted noise caused by the contact of repeating tread elements on the ground in use of the tire.

Each length comprises two groove sidewall portions, one on each side of the groove. The groove sidewalls are the same on each side except that due to the zig-zag nature of the groove, there is a displacement of one groove sidewall relative to the other by half a pitch length.

As can be seen in the Figures each recess 20 has steeply sloping groove sidewalls devoid of any supporting buttress. Each long length 23 or 26 is supported by buttress 5 which has a top surface 28 inclined to the tread surface. The height and width of the buttress increases rectilinearly from the groove base (where the height and width are both zero) adjacent the junction 29 of the long length and the recess, to the other end 30 of a long length 23 or 26 adjacent the projection 21 where the buttress height and width are a maximum. At this point the top of the buttress is a small distance, about 1 mm, below the tread surface. The side surface 21 of the buttress along a long length 23 or 26 is now parallel to the groove sidewall portion. The projection is formed with a buttress 5a which is of constant height and width, which are respectively the same as the maximum height and width of the buttress 5 supporting each long length 23 or 26.

As with the tread of the fourth embodiment, the tread of the fifth embodiment has maximum groove sidewall support provided not only by the maximum height and width of the buttress 5 but also by the projection 21, which can be regarded as part of the buttress. There is minimum support at the re-entrant part of the groove, not only because the buttress has zero height and width but because of the V-shaped recess 20 in the groove sidewall.

In all embodiments just described, short shallow sipes, a few millimetres long and deep, may be provided in the tread between the grooves, or between a groove and a longitudinal edge of the tread strip. The sipes may be for purposes of traction, drainage, or to alter slightly the compliance of the tread. The sipes may or may not connect with one or more of the grooves.

Having now described our invention, what we claim is:

1. A tire tread comprising an elongate strip having a pattern formed in that surface which is intended to contact the ground in use of a tire incorporating the tire tread wherein the pattern includes a continuous or discontinuous zig-zag groove extending generally longitudinally of the strip, the groove comprising two sidewalls, one on each side of the groove, each sidewall comprising straight or substantially straight portions, each portion of which extends at an acute angle to the length of the strip, and a buttress supporting a part of at least one of the portions, the height of the buttress varying along the portion to provide a progressively increasing degree of support thereto, a minimum height and thus a minimum degree of support being provided at or adjacent to that end of the portion extending into the groove, and a maximum height and thus a maximum degree of support being provided at or immediately adjacent to that end of the portion extending into the tread and wherein the maximum height of the buttress is less than the groove depth.

2. A tire tread according to claim 1 wherein the variation in the height of the buttress is gradual.

3. A tire tread according to claim 2 wherein the gradual variation in the height of the buttress is rectilinear.

4. A tire tread according to claim 2 wherein the gradual variation in the height of the buttress is curvilinear.

5. A tire tread according to claim 1 wherein the variation in the height of the buttress is stepwise.

6. A tire tread according to claim 1 wherein the degree of support is varied by varying the width of the buttress.

7. A tire tread according to claim 6 wherein the variation in the width of the buttress is gradual.

8. A tire tread according to claim 7 wherein the gradual variation in the width of the buttress is rectilinear.

9. A tire tread according to claim 7 wherein the gradual variation in the width of the buttress is curvilinear.

10. A tire tread according to claim 6 wherein the variation in the width of the buttress is stepwise.

11. A tire tread according to claim 1 or 6 wherein the buttress is discontinuous along the length of the sidewall portion.

12. A tire tread according to claim 1 or 6 wherein the side surface of the buttress is inclined to the normal to the tread surface at a constant angle.

13. A tire tread according to claim 12 wherein the angle of inclination of the side surface of the buttress is the same as the angle of inclination of the groove sidewall portion.

14. A tire tread according to claim 1 wherein the top surface of the buttress is parallel to the ground-contacting surface of the tread.

15. A tire tread according to claim 1 wherein the top surface of the buttress is inclined to the normal to ground-contacting surface of the tread.

16. A tire tread according to claim 1 wherein a projection is provided at the end of the groove sidewall portion extending into the tread.

17. A tire tread according to any claim 1 wherein a recess is provided at the end of the groove sidewall portion extending into the groove.

18. A pneumatic tire incorporating a tire tread according to claim 1 or 6.

19. A pneumatic radial ply truck tire incorporating a tire tread according to claim 1 or 6.

* * * * *